United States Patent [19]
Wolfbauer et al.

[11] Patent Number: 4,795,099
[45] Date of Patent: Jan. 3, 1989

[54] CORRECTION STEERING FOR A LINEARLY MOVABLE IRRIGATION SYSTEM

[75] Inventors: Wilhelm Wolfbauer, Fernitz; Vinzenz Stadler, Stallhofen, both of Austria

[73] Assignee: Rohren - Und Pumpenwerk Rudolf Bauer Aktiengesellschaft, Voitsburg, Austria

[21] Appl. No.: 75,813
[22] PCT Filed: Nov. 10, 1986
[86] PCT No.: PCT/AT86/00073
§ 371 Date: Jun. 19, 1987
§ 102(e) Date: Jun. 19, 1987
[87] PCT Pub. No.: WO87/02862
PCT Pub. Date: May 21, 1987

[30] Foreign Application Priority Data
Nov. 11, 1985 [AT] Austria .................. 3277/85

[51] Int. Cl.⁴ .......................... A01G 25/09; B05B 3/18
[52] U.S. Cl. ........................ 239/733; 239/737; 239/739
[58] Field of Search ............ 239/726, 732, 733, 737, 239/739

[56] References Cited
U.S. PATENT DOCUMENTS

| 3,613,703 | 10/1971 | Stout | 239/733 |
| 3,974,845 | 8/1976 | Indresaeter | 239/733 X |
| 4,172,551 | 10/1979 | Johnson | 239/733 |
| 4,184,639 | 1/1980 | Miller | 239/733 |
| 4,190,068 | 2/1980 | Beusch et al. | 239/733 X |
| 4,284,240 | 8/1981 | Courtright et al. | 239/739 X |
| 4,330,085 | 5/1982 | Siekmeier et al. | 239/733 X |
| 4,350,295 | 9/1982 | Gheen | 239/732 X |
| 4,358,055 | 11/1982 | Reinke | 239/733 |

FOREIGN PATENT DOCUMENTS 1135301 11/1982 Canada.
2851425 5/1979 Fed. Rep. of Germany.
3049436 10/1981 Fed. Rep. of Germany.

*Primary Examiner*—Andres Kashnikow
*Assistant Examiner*—Mary Beth O. Jones
*Attorney, Agent, or Firm*—Herbert Dubno

[57] ABSTRACT

Correction steering for a linearly movable irrigation system, consisting of interconnected pipes carried by motorized irrigation towers, whereby at least one irrigation tower constitutes a steering unit for correction of the irrigation system in the case of an angular deflection occurring with respect to the guideway, which deflection is automatically detected by sensors arranged on a bar located in the area of the irrigation tower pertaining to the steering unit, which sensors are in operational contact with the guideway; the bar is a sensor arm (12) which is supported to rotate about a vertical axle (13); the axle (13) is arranged at one of the irrigation towers (1) of the steering unit and the sensor arm (12) is connected with the support (24) located at the outer end of the pipe (5).

8 Claims, 1 Drawing Sheet

U.S. Patent  Jan. 3, 1989  4,795,099
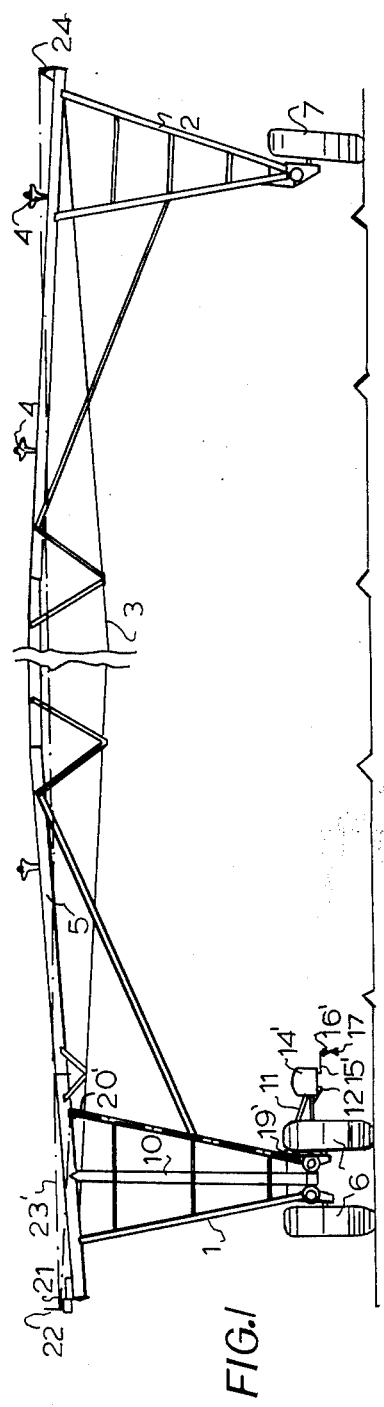
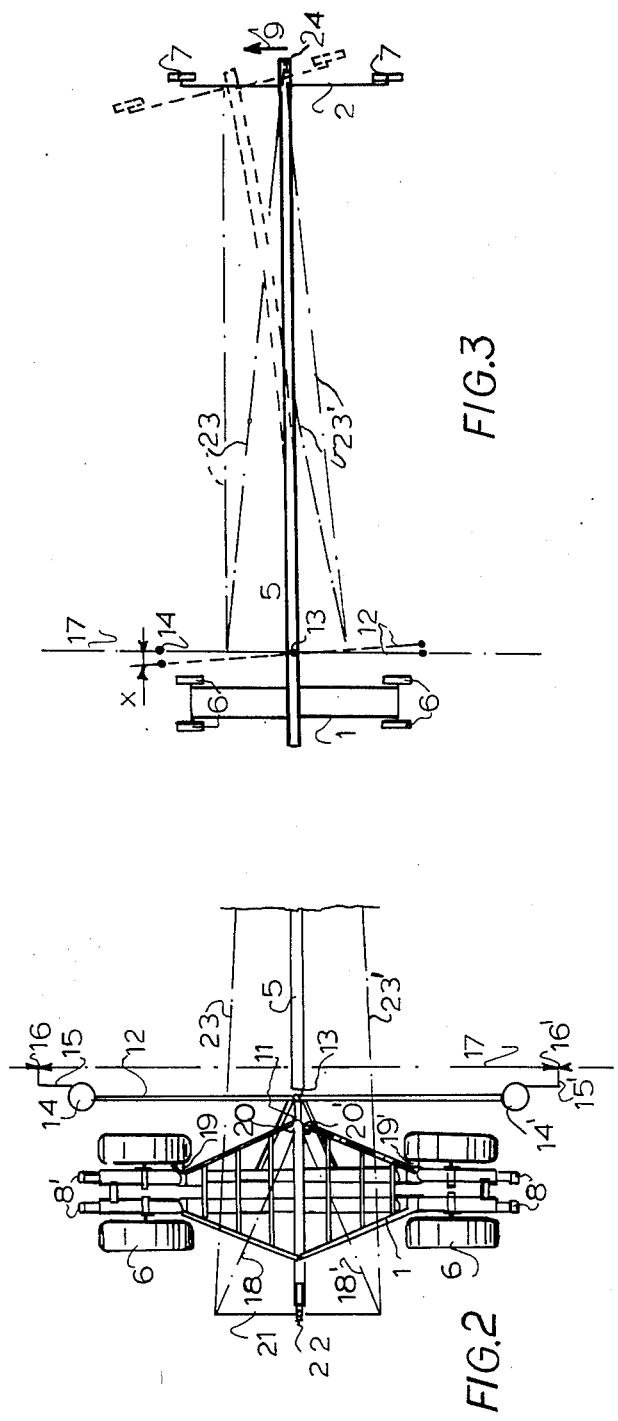

CORRECTION STEERING FOR A LINEARLY MOVABLE IRRIGATION SYSTEM

CROSS REFERENCE TO RELATED APPLICATIONS

This application is a national phase application of PCT/AT 86 00073 file Nov. 10, 1986 and based, in turn, upon an Austrian National application A 3277/85 filed Nov. 10, 1985.

FIELD OF THE INVENTION

The invention relates to a correction steering for a linearly movable irrigation system, consisting of interconnected pipes carried by motorized irrigation towers, whereby at least one irrigation tower constitutes a steering unit for correcting the angular displacement occurring in the irrigation system with reference to a guideway, which is automatically detected by sensing elements located on a horizontal bar arranged parallel to the guideway in the area of the irrigation tower having the steering unit, these sensors being in an operative connection with the guideway.

BACKGROUND OF THE INVENTION

Sprinkler systems of this kind usually having a steering unit and several successively connected outriggers, whereby the steering unit is mostly laterally arranged and serves for steering correction, i.e. the correction of a deviation from the guideway, while the outriggers adjust their mutual advance via a directional steering.

A linearly movable irrigation system is known from the German open application No. 2 851 425, which follows via a sensor arrangement an underground electrical conduit path, and is provided with means to stop the propulsion of the outrigger which is the most extreme at the moment, in case of deviation from the path. The sensor arrangement is mounted on a horizontal bar, which in turn is rigidly connected with the outrigger, preferably at an angle of 90°. The reference point determining the position of the sprinkling system is fixed from the point of view of its position with respect to the sprinkler pipe.

Further, it is proposed to support the bar at the outrigger arm at the irrigation tower so that it is rotatable about a vertical axis, for an oscillating motion and to slidably guide its free end along a guiding means arranged at the margin of the field (rail, cable, etc.). The bar's angle of rotation measures the deviation. An angle sensor located in the area of the axis of rotation detects each deviation from the right angle and transmits the steering order to the irrigation tower which is the most extreme at the moment. These two steering modes presume that the outrigger or the irrigation tower to which the bar is mounted, deviates. This deviation is especially critical when this outrigger is the one with the steering unit and the thereon mounted heavy equipment and is at the same time, the most extreme element of the irrigation system.

Depending on the direction of travel and the kind of deviation reading of the sensor mechanism, one of the two most extreme irrigation towers is immobilized and becomes thereby the rotation point for the continuously moving irrigation system, which can execute a turning motion. In the course of this turning motion, the error (twisting or lateral deviation) is compensated and the completion of the correction is again detected by the sensing device, whereafter the immobilized tower receives the order to continue its travel. It is possible that in the case of gross deviations of the actual travel path from the desired one it is necessary to perform several successive corrections, until the correction operation is concluded.

The mentioned outrigger is used as a stationary steering tower of a pivot-irrigation system, based on the steering characteristics shown in the German open application No. 3 049 436; the whole system revolves about this tower until the orientation has been again set on its path corrected. Due to the heavy weight, the wheels of the steering unit sink into the softened ground during the sprinkling operation and produce ruts, which after the conclusion of the sprinkling operation dry and harden. When the system travels back to its starting position at the field's end, without sprinkling, the wheels move in the formed rut, cannot deviate laterally and travel like on tracks. As a result, the steering unit cannot be effective, which leads to the fact that the forerunning irrigation tower cannot receive a stop signal. Under these circumstances it can happen that all outrigger elements continue their travel, until a so-called "banana" forms, which means for the steering unit that the pipe system together with the frame can be dangerously bent between the two irrigation towers. This bending leads to damage or to the breakage of the installation.

The Canadian patent No. 1 135 301 shows a linearly movable irrigation system, which is equipped with a special directional-steering installation, permitting the mutual adjustment of the individual outrigger elements. Thereby, the motion for the directional steering mounted on the outrigger at the tower side is taken over by a couple of cables from the opposite end of the outrigger. The rigid square formed this way by the pair of cables and the two cross beams defines the position of the outrigger, so that errors due to bending of the same which would be picked up by the directional steering, can be avoided. The polygon is involved in the correction of the advance movement of the irrigation system in order to twist the two switch boxes arranged between two certain irrigation towers—which are designated for the correction of the advancement—in such a manner that an angling to the neighboring pipe segment in the case of a deviation is apparently minimized or increased, which leads to an immobilization of one of the two towers, and to a pivoting of the system thereabout or to a restart of the tower. For the detection of a lateral displacement of the system, an additional switch box with sensor means is provided.

OBJECT OF THE INVENTION

It is the object of the invention to create a correction steering for a linearly movable sprinkling system which is as simple as possible from the point of view of production, assembly and or rectification of complicated corrective steering operations, whereby the possibility of an undesired drastic bending of the steering unit during the correction of the angular deviations of the system with respect to the travel path is excluded, and which furthermore affords a high operational safety, so that damaging of the installation can be avoided as much as possible.

SUMMARY OF THE INVENTION

The invention solves the problem due to the fact that the bar is a sensor arm, which is rotatably supported around a vertical axle, which is mounted to a tower of the steering unit and that the sensor arm is connected with a support arranged at the outer end of the pipe system.

Another feature of the system is that he sensor arm is connected via cables with a beam and the beam is connected via cables with the support.

A further feature of the invention is that the sensors are arranged on the respectively free end of the sensor arm and that the beam is parallel to the sensor arm.

Yet another feature of the invention is that the beam is rotatably supported around a vertical axle rigidly connected with the pipe system in the area of the irrigation tower carrying the sensor arm and that the beam together with the cables leading to the support form an isosceles triangle.

Another further feature of the invention consists in the fact that the support is rigidly connected with the pipe system.

The invention is closer described in the drawing with the aid of one embodiment example.

BRIEF DESCRIPTION OF THE DRAWING

The above and other objects, features and advantages of my invention will become more readily apparent from the following description, reference being made to the accompanying highly diagrammatic drawing in which:

FIG. 1 is an elevational view which shows the steering unit of an irrigation system;

FIG. 2 a top view of the correction-steering component of the steering unit; and FIG. 3 is a diagram of the operation in a simplified form.

SPECIFIC DESCRIPTION

The steering unit consist of the two irrigation towers 1, 2 connected by a pipe system 5 equipped with sprinklers 4 and bound by a truss 3. The irrigation tower 1 carries a generator not shown in the drawing and a pump and has for the purpose of increasing its support base four wheels 6, driven by electromotors with gearing also not shown in the drawing, while the opposite, considerably lighter irrigation tower 2 travels on two wheels 7.

Water connections 8 at the irrigation tower 1 for the advance travel of the irrigation system in the direction of the arrow 9 and connections 8' for the reverse travel opposite the arrow direction feed the sprinkler water over a riser 10 to the pipe 5.

On a lateral support 11 protruding away from the tower 1 a horizontal sensor arm 12 is supported, which approximately in the middle can be pivoted around a vertical axis 13. At a free end of the sensor arm 12 a sensor 14 for the advance travel is located, as well as an equivalent sensor 14' for the reverse travel, at the opposite end.

These two sensors 14, 14', as is known for instance from directional central in linear or pivotal system, comprising a trigger cam not shown in the drawing and two control switches corresponding thereto. Mechanical sensors 15, 15' with guide rollers 16, 16' make the connection between the trigger cam and the guide cable 17 extended alongside the field, whereby the guide rollers 16, 16' are constantly in touch with the guide cable 17 during the travel of the irrigation system. This detection does not necessarily have to be a mechanical detection, and also a contact-less electromagnetical scanning can be used. Two cables 18, 18' lead away, via deflection rollers 19, 20, respectively 19', 20' from the sensor arm 12 towards the two free ends of a horizontal beam 21, which in turn is supported rotatably about a vertical axis 22 at the end of the pipe strand 5 in the area of the tower 1.

From the linking point of the cables 18, 18' to the beam 21, a pair of horizontal cables 23, 23' extend up to the support 24 mounted to the pipe 5 in the area of the irrigation tower 2, to which support they are both fastened.

However, it is easily possible to connect the sensor arm 12 directly with the support located on the pipe 5, without impairing the work principle. This variant is not shown in the drawing.

The operational mode of the correction steering according to the invention can be discerned from FIG. 3:

When the steering unit and therewith the entire irrigation system travels along the guide cable 17 (while generally oriented at a right angle to it), the sensor arm 12 coincides with the guide cable 17, or, according to FIG. 2, is in a position parallel to the latter, which means that the correction steering remains inactive.

If, for instance, to the contrary, during the advancement in the direction of the arrow 9, the right most extreme outrigger of the sprinkling system and therewith also the tower 2 of the steering unit go too far ahead, the mentioned right outrigger has to be stopped, before a so-called "banana formation" occurs, i.e. before a dangerous bending of the steering unit results. While in the case of the prior art installation, in a similar situation the tower 1 would have to turn, in order to measure the angular displacement from the travel path, due to the correction steering of the invention, the tower 1 remains in its path, without twisting.

The smallest acceptable bending of the pipe 5 together with the framing 3 is transmitted directly by the cable 23' to the sensor arm 12, according to FIG. 3, which arm has then, in its position marked with broken lines, a distance X at its free end from the cable 17. This distance X is registered by the sensor 14 (the corresponding control switch is activated through the twisting of the trigger cam) and in this case the order to stop the extreme right outrigger is given. In the same way, is the forerunning extreme left outrigger stopped—and in case this outrigger constitutes the central unit at the same time—so is irrigation tower 1. As a result of a counterbending of the pipe 5, the sensor arm 12 comes to be in a mirror-image reversed position with respect to the guide cable 17, which again is detected by the sensor 14 and translated into the corresponding steering signal.

As already mentioned, FIG. 3 shows a simplified embodiment of the control steering according to the invention, whereby the pair of cables 23, 23' are connected directly with the sensor arm 12, starting from the support 24.

Since in practice such a solution would not be possible for space reasons, the cables 23, 23' are arranged according to FIG. 1 and FIG. 2 along the pipe 5. These detect the deflection of the steering unit and indicate this deflection on the beam 21, while the cables 18, 18' transmit the motion to the sensor arm 12, without stepping up or reduction from the beam 21, which means that the beam 21 and the sensor arm 12 are always parallel to each other.

As can be seen from FIGS. 1 and 3, each of the two cables 18 and 18' extends from a respective end of the bar 21 inwardly to the pulleys 20 and 20' and then downwardly and outwardly to the pulleys 19 and 19' proximal to the pairs of wheels 6 of the first motorized tower and then, to the right as seen in these figures, to attach to the sensor arm 12 substantially equidistantly between the pivot axis 13 and the respective sensor 14 and 14' at the respective end of this arm.

We claim:

1. An apparatus which comprises the combination of a steering correction device for a linearly moving irrigator, said linearly moving irrigator comprising:
    a first motorized tower provided with the steering correction device and movable in a displacement direction along a guideway;
    another motorized tower remote from the steering correction device; and
    means including a pipe interconnecting said towers, said steering correction device comprising:
    a horizontal sensor arm pivotally mounted on said first motorized tower to swing about a substantially vertical axis and generally extending parallel to said guideway;
    a sensor on said arm responsive to angular displacement of said arm about said axis in operative connection with said guideway; and
    flexible cable means connected to said arm and engaged with a support connected to said pipe at a location remote from said first motorized tower for swinging said arm about said axis upon a displacement of said pipe relative to said first motorized tower representing an angular disorientation of said irrigator to enable correction of said disorientation by said sensor on said arm.

2. The apparatus defined in claim 1 wherein said steering correction device further comprises a substantially horizontal beam pivotally mounted on said first motorized tower to swing about a substantially vertical axis and said flexible cable means including cables connecting said beam with said support, and further cables connecting said beam with said arm.

3. The apparatus defined in claim 2 wherein said beam is substantially parallel to said arm.

4. The apparatus defined in claim 3 wherein said beam is located substantially at a level of said pipe and said arm is located at a level substantially below the level of said pipe.

5. The apparatus defined in claim 1 wherein said sensor is one of a pair of sensors mounted on opposite free ends of said arm.

6. The apparatus defined in claim 2 wherein said beam forms an isosceles triangle with the cables connected thereto from said support.

7. The apparatus defined in claim 1 wherein said support is rigidly connected to said pipe.

8. The apparatus defined in claim 7 wherein said support is rigidly connected to said pipe at said other tower.

* * * * *